Nov. 13, 1962  B. J. MORRIS  3,063,733
VEHICLE SUSPENSION SYSTEMS
Filed Dec. 22, 1959  2 Sheets-Sheet 1

3,063,733
VEHICLE SUSPENSION SYSTEMS

Bryan John Morris, Styvechale, Coventry, England, assignor to Dunlop Rubber Company Limited, London County, England, a company of Great Britain
Filed Dec. 22, 1959, Ser. No. 861,313
Claims priority, application Great Britain Dec. 24, 1958
6 Claims. (Cl. 280—124)

This invention relates to suspension systems for vehicles of the kind having wheels located upon opposite sides of the vehicle.

It is well known that such vehicles are prone to rolling about their longitudinal centre lines and it is usually considered desirable to support the vehicle body or chassis on spring means located as far out as possible from the centre line in order to control or prevent such rolling.

Due to the requirements that the suspension should effectively control rolling of the loaded vehicle, the conventional leaf springs are very strong. This leads to a very harsh ride characteristic when the vehicle is unloaded. with the result that the driving wheels are often clear of the ground when the vehicle is in motion. This leads to accelerated tire and transmission wear. The springs are also exposed to moisture and dirt thrown up by the vehicle wheels.

The object of this invention is to provide an improved anti-roll suspension system which overcomes the above disadvantages.

According to the present invention a vehicle anti-roll suspension system comprises a pair of substantially cylindrical springs deformable between their ends and located one at each side of the vehicle centreline and inboard of the body or chassis, a pair of levers pivotably connected intermediate their ends to said body or chassis and having opposite ends respectively associated with one of the said springs and with an axle or like wheel carrying means.

Preferably the pivotable connection intermediate the ends of the levers is a spherical joint which is positioned outboard of the line joining the points at which the lever is joined to the axle and the said spring, which for preference is pneumatic.

The axle is located transversely by light leaf springs, which also serve the purpose in conjunction with the lever of carrying torque due to braking or acceleration. By choosing the four points, namely the pivot connection of the lever to the chassis, the virtual centre of the spring, the connection point of the spring to the axle and the connection of the lever to the axle, when taken in that order to be at the four corners of a parallelogram torque is carried without imposing a bending moment on the leaf spring. It is possible that the four points mentioned above will not be exactly coplanar but only substantially so in which case there will be some slight bending moment imposed on the leaf spring.

The invention will now be described with reference to the accompanying drawings of which:

Figure 1:
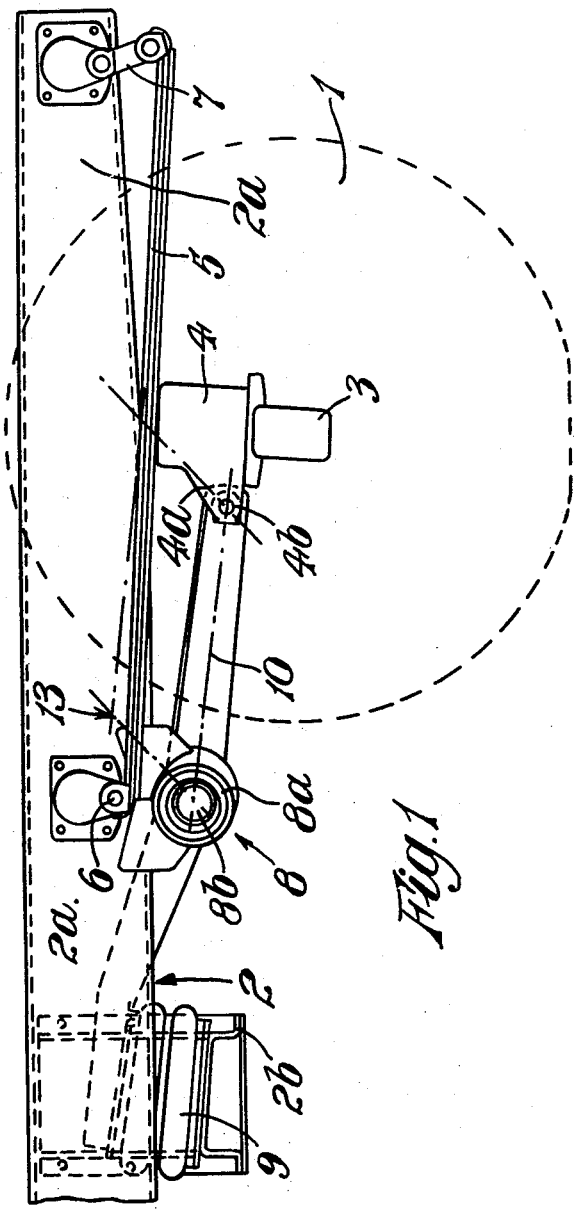
FIGURE 1 is a side elevation of a vehicle suspension system.
Figure 2:
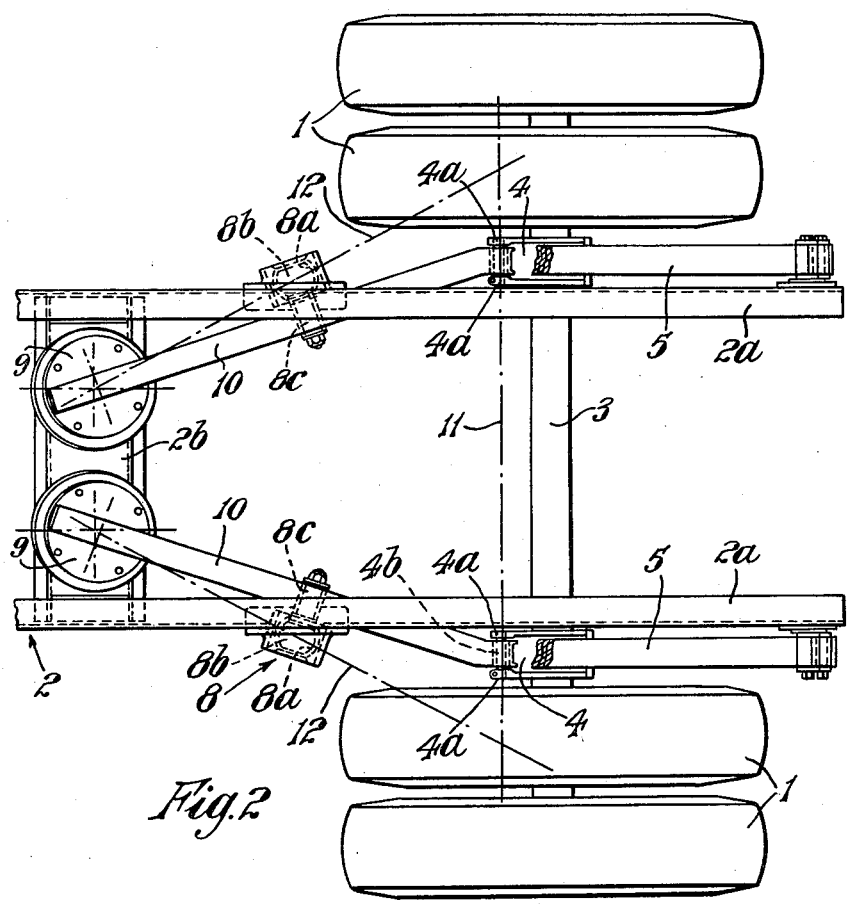
FIGURE 2 is a plan view of FIGURE 1.

The vehicle illustrated and described is of the commercial type having dual wheels 1 and a chassis 2.

The chassis 2 has parallel side members 2a and an axle 3 carries the dual wheels 1. Two saddles 4 are provided on the axle 3 inboard of the wheels 1 and outboard of the chassis 2 and light leaf springs 5 are clamped to the top of each saddle 4, and opposite ends of each spring are pivotally secured to the chassis side members 2a through shackle pins 6 and hanger links 7 respectively.

Each saddle 4 has a pair of lugs 4a projecting forwardly of the axle 3 near the base of the saddle and a pin 4b extending through each pair of lugs 4a. The holes for the pins 4b are co-axial and parallel to the wheel axle 3. Forwardly of each saddle a spherical joint 8 is disposed, comprising a socket 8a fastened to and on the underside of each chassis side member 2a, a ball 8b rotatable in each socket 8a and a shank 8c integral with each ball 8b projecting towards the vehicle centreline. Forwardly of the joints 8 the chassis side members 2a are bridged by an underhung platform 2b on which two double convoluted bellows type fluid springs 9 are supported one on each side of and adjacent to the centreline.

A rigid lever 10 extends between each spring 9 and the saddle 4 on the same side of the vehicle, each lever 10 being pivoted between its ends on a respective ball shank 8c and cranked at one end. The cranked end is journalled upon the saddle pin 4b and the other end overlies and abuts the fluid spring 9.

Pivotal movement of either lever 10 in the direction which takes the axle 3 towards the chassis 2 causes the corresponding fluid spring 9 to be deflected.

In the system above described each fluid spring 9 will act as though it were located with its axis at the intersection of the axis 11 of the saddle pins 4b and a straight line 12 drawn from the actual fluid spring 9 axis and passing through the pivotal centre of the ball joint 8, and because the sockets 8a of the latter are fastened to the chassis side members 2a and the fluid springs 9 are actually located between the side members 2a the intersection will be outwardly of the side members 2a. Hence it is possible to obtain the same anti-roll characteristics with the fluid springs 9 actually located near the centreline as if these springs were located over the wheels 1.

In this system the pivotal centre of the ball joint 8, the virtual centre 13 of the leaf spring 5, the point of attachment of the leaf spring 5 to the saddle 4 and the pivot point of the saddle pins 4b when taken in that order form the corners of a parallelogram.

The virtual center 13 of the leaf spring 5 is determined by the relative positions of the spring, the pivotal connections 8b and 4b relative to the chassis. This may be illustrated as follows:

When the brakes are applied to the wheels the chassis tends to move forwardly relative to the axle 3 and the connection of the spring connected to the chassis is subjected to a force tangential to the center of the axis of the axle and therefore acting in a straight line in this direction. This line need not lie within the leaf spring itself but may be in the direction shown in the dot and dash line of FIG. 1. At the same time the reaction of this force on the spring, tending to turn the saddle 4 about the axis of the axle, will tend to draw the pivotal connection 4b in the opposite direction and this will be in a direction along the line 10 between the pivotal centers 4b and 8b, thus putting a stress on the pivot 8b contrary to the direction of the forces acting on the spring. If the position of the pivots, spring and chassis are such that these forces are parallel, the virtual center of the spring would be at the intersection of the line of force acting on the spring and a line parallel to a line connecting the pivot 4b to the point at which the spring is secured on the saddle. This will form a parallelogram of two opposite acting forces. In accelerating the axle will tend to move forwardly in relation to the chassis and the direction of these forces will be reversed. This is so that accelerating or braking torque can be taken as two parallelly acting oppositely directed forces acting through the lever 10 and the spring 5 respectively, and since both forces are directed along the opposite sides of the parallelogram no bending moment is imposed on the leaf spring 4. This allows a light spring to be used which will fulfil only the requirements of lateral location of the axle and transmission of the forces arising from torque.

Alternatively a link may be used to replace the leaf spring, the ends of the link forming with the two points mentioned on the lever a parallelogram to carry torque. Transverse location of the axle may then be effected by means of a Panhard rod or like device.

The levers may be chosen to provide a desired mechanical advantage if required by selection of the lever arm lengths.

An advantage of the system is that in general for the same desired anti-roll effects it is lighter and provides a smoother ride than a conventional leaf spring suspension system.

A further advantage of the system is that the spring, which need not be pneumatic, is removed from the immediate neighbourhood of moisture and dirt thrown up by the wheels.

Having now described my invention, what I claim is:

1. An anti-roll suspension system for a wheeled vehicle comprising a vehicle chassis, an axle transverse to the center line of said chassis movable vertically relative to said chassis, wheels mounted on said axle, at least one outboard of each side of said chassis, a pair of levers, one on each side of the center line of said chassis extending from a point inboard of the sides of said chassis to a point at said axle outboard of said chassis and inboard of a wheel mounted on said axle and pivotally connected to said axle at said point, a spring for each said lever connecting the inboard end of said lever to said chassis and positioned to support the chassis from the inboard end of the lever and a fulcrum for said lever mounted on said chassis, providing a universal pivotal connection to said lever outboard of a straight line connecting the connection of said lever to said spring and to said axle.

2. An anti-roll suspension system according to claim 1 wherein said pivotable connection of said lever to said chassis comprises a universal joint.

3. An anti-roll suspension system according to claim 2 wherein said universal joint is a spherical joint.

4. An anti-roll suspension system according to claim 1 wherein said springs comprise pneumatic springs.

5. An anti-roll suspension system according to claim 1 comprising a pair of light leaf springs mounted between the axle of said vehicle and said chassis in position to fix the location of said axle relative to said chassis.

6. An anti-roll suspension system according to claim 5 wherein the pivot point of the lever to the axle together with the point at which the leaf spring is connected to the axle, the virtual centre of the leaf spring and the pivot point of the lever on the chassis when taken in cyclic order form the four corners of a parallelogram.

References Cited in the file of this patent

UNITED STATES PATENTS

| | | |
|---|---|---|
| 1,679,268 | Rigney | July 31, 1928 |
| 1,849,765 | Masury | Mar. 15, 1932 |
| 2,023,135 | Hawkins | Dec. 3, 1935 |
| 2,260,634 | Mullner | Oct. 28, 1941 |
| 2,740,640 | Schaefer | Apr. 3, 1956 |

FOREIGN PATENTS

| | | |
|---|---|---|
| 267,099 | Italy | Aug. 24, 1929 |